United States Patent [19]
Beard et al.

[11] Patent Number: 5,452,761
[45] Date of Patent: Sep. 26, 1995

[54] SYNCHRONIZED DIGITAL STACKING METHOD AND APPLICATION TO INDUCTION LOGGING TOOLS

[75] Inventors: David Beard; Carlos Yansig; Robert A. Lester, all of Houston, Tex.

[73] Assignee: Western Atlas International, Inc., Houston, Tex.

[21] Appl. No.: 331,802

[22] Filed: Oct. 31, 1994

[51] Int. Cl.$^6$ .................................................. E21B 43/00
[52] U.S. Cl. ......................................................... 166/250
[58] Field of Search ................................... 166/250, 254, 166/255, 369, 66; 175/40, 45, 48, 50

[56] References Cited

U.S. PATENT DOCUMENTS

| | | | |
|---|---|---|---|
| 5,042,297 | 8/1991 | Lessi | 166/250 X |
| 5,186,048 | 2/1993 | Foster et al. | 166/250 X |
| 5,353,872 | 10/1994 | Wittrisch | 166/250 |

OTHER PUBLICATIONS

Meyer, W. H.; Wu, Jian–Qun; Macune, D. T.; Harvey, P. R.; Near–Bit Propagation Resistivity for Reservoir Navigation, SPE 69th Annual Technical Conference and Exhibition, New Orleans, La. U.S.A. 25–28 Sep. 1994.

*Primary Examiner*—Michael Powell Buiz
*Attorney, Agent, or Firm*—Darryl M. Springs; Richard A. Fagin

[57] ABSTRACT

An apparatus and method for digitally processing signals received by an induction logging tool having a transmitter and a plurality of receivers. An oscillating signal is provided to the transmitter, which causes eddy currents to flow in a surrounding formation. The magnitudes of the eddy currents are proportional to the conductivity of the formation. The eddy currents in turn induce voltages in the receivers. The received voltages are digitized at a sampling rate well above the maximum frequency of interest. The digitizing window is synchronized to a cycle of the oscillating current signal. Corresponding samples obtained in each cycle are cumulatively summed over a large number of such cycles. The summed samples form a stacked signal. Stacked signals generated for corresponding receiver coils are transmitted to a computer for spectral analysis. Transmitting the stacked signals and not all the individually sampled signals, reduces the amount of data that needs to be stored or transmitted. A Fourier analysis is performed on the stacked signals to derive the amplitudes of in-phase and quadrature components of the receiver voltages at the frequencies of interest. From the component amplitudes, the conductivity of the formation can be accurately derived.

15 Claims, 5 Drawing Sheets

SYNCHRONIZED DIGITAL STACKING METHOD AND APPLICATION TO INDUCTION LOGGING TOOLS

BACKGROUND OF THE INVENTION

1. Field of the Invention

The present invention relates to processing data obtained by an induction tool used to measure conductivity of a formation in a borehole. More particularly, the present invention relates to a method for processing signals, generated by receiver coils in the induction tool, entirely in digital form to determine the formation conductivity.

2. Description of the Related Art

The sedimentary portion of the inner surface of the earth typically includes successive layers or beds having non-uniform thicknesses. Each bed has an electrical conductivity which is indicative of the amount of hydrocarbon deposits existing in that bed. Electrical conductivity logging relates to the determination of the conductivity of the successive beds of the formation for hydrocarbon exploration. Electrical conductivity logging is based on the fact that most rocks and hydrocarbons are insulators, whereas connate waters are generally saline, and therefore, good conductors.

In geophysical well logging, a sonde or probe is lowered into a borehole in the earth. The sonde includes sensors and other equipment for measuring the physical parameters that characterize the formation. Electrical equipment forms part of the sonde for receiving and processing information from the sensors either to store data or to send the data to the surface. This data is typically sent by digital telemetry circuitry through the earth or through a wireline cable used to lower the sonde, as appropriate.

In an induction logging tool, the conductivity of the formation is measured by generating eddy currents in the formation. In general, an induction logging tool includes at least one transmitter coil and at least one receiver coil longitudinally separated and positioned along the tool axis. Induction logging measures the conductivity of the formation by first inducing eddy currents to flow in the formation in response to a current flow through the transmitter coil, and then measuring an in-phase component of a signal generated in the at least one receiver coil in response to the presence of the eddy currents. Variations in the magnitude of the eddy currents in response to variations in the formation conductivity are reflected as variations in the received signal. Thus, in general, the magnitude of the in-phase component of the received signal, that component in phase with the transmitter current as determined by a phase sensitive detector (PSD), is indicative of the conductivity of the formation.

The amplitude of the in-phase component of the signals received by the induction tool are usually derived with analog circuitry, such as that disclosed in U.S. Pat. No. 4,499,421 to Sinclair. Sinclair discloses a digital induction logging system including means for generating a plurality of transmitter frequencies. Sinclair poses the problem that prior art induction logging tools, which have been primarily analog in design, included limitations which prevented them from meeting a growing need for more precise, accurate, and error-free measurements of in-phase component signals in the received signals.

Some of the main sources of the errors and inaccuracies in measurement of phase and amplitude of the received signals are static phase-shift errors and dynamic or temperature-dependent phase-shift errors. Static phase-shift errors are those errors which occur when the tool is operating at a steady state temperature condition and generally are caused by design tolerances of electrical circuits in the tool, which include the transmitter and receiver coils, amplifiers, and PSD's. The dynamic phase-shift errors occur as a result of temperature changes occurring in the transmitter and receiver coils, the amplifiers and the PSDs. This is a major problem as great temperature differences exist at different depths in the borehole. Unpredictable phase-shifts may also be introduced by electronic component tolerances. Such phase-shift errors cause the transmitter signal to be distorted, which can cause the harmonic frequency signals of the fundamental frequency signal to have large amplitudes. Because the formation has different induction responses at different frequencies, the enhanced amplitudes of the harmonic frequency signals due to the phase shifts would introduce false signals—that is, noise—into the receiver coil, that may cause a misleading result to be obtained from the induction tool measurement.

Sinclair teaches that to obtain accurate in-phase component signal measurements that are essentially free of the static and temperature dependent phase-shift errors, a highly phase stable, low distortion transmitter signal must be generated. The Sinclair tool accomplishes this by including a waveform generator for digitally generating a low distortion, phase-stable sinusoidal transmitter signal from at least two selectable frequencies. The frequency selected can be based upon the value of the conductivity of the formations being encountered. A review of Sinclair, however, reveals that the elaborate circuitry needed to appropriately measure the formation conductivity in a borehole makes the Sinclair tool complex when the transmitter signal contains multiple frequencies. Further, the phase stable, low distortion transmitter signal does not completely remove dynamic or static phase-shift errors, thereby requiring that automatic phase compensation be provided to dynamically compensate for both the static and dynamic temperature dependent phase errors.

Another problem with analog detection circuits is that they are usually sensitive to odd harmonics of the fundamental frequency of the transmitter signal, so that there is a requirement for good spectral purity in the transmitter circuitry. This problem is addressed in U.S. Pat. No. 4,965,522 to Hazen, which discloses a multi-frequency signal transmitter with attenuation of selected harmonics, for use in an array induction logging tool. In the Hazen technique, switching and filtering circuitry is used to attenuate the amplitudes of frequency components of the third harmonic and other undesired harmonics. Thus, Sinclair and Hazen disclose the limitations associated with analog-type induction logging tools.

Therefore, it is desirable that a formation conductivity measuring technique using induction logging tools be developed that avoids the limitations of analog-type tools. Attempts at performing digital processing of the induction tool signal data have heretofore met with limited success due to the enormous amounts of data that need to be processed and transmitted by the downhole tool.

SUMMARY OF THE PRESENT INVENTION

In its broadest form, the present invention is directed to a method for processing signals in a well logging tool used to determine at least one characteristic of a formation penetrated by a wellbore, the tool comprising at least one transmitter and at least one receiver. The method includes the steps of: activating the at least one transmitter using energy characterized by a periodic waveform, the energy also having a predetermined fundamental frequency and predetermined supplemental frequencies, for a predetermined number of cycles of the fundamental frequency; activating the at least one receiver to generate signals; digitizing the signals into a plurality of samples corresponding to time segments of a single cycle of the transmitter; repeating the step of digitizing the signals and adding time-correspondent samples of successively digitized signals to the time-correspondent samples of previously digitized signals; and processing the digitized signals to obtain characteristic information about the formation.

The present invention is may also be directed to an apparatus for determining at least one characteristic of a formation penetrated by a wellbore including a sonde having a plurality of receiver coils and at least one transmitter coil. An oscillating signal, which is preferably a square wave signal and which has multiple frequency components, including a fundamental frequency component, generates a current in the transmitter coil. As a result, eddy currents having intensities proportional to the conductivity of the formation are induced in the formation. Electric fields generated by the eddy currents in turn cause currents to flow through the plurality of receiver coils. The received signals are then amplified and converted to digital signals by a plurality of analog-to-digital (A/D) converters. The fundamental period of the oscillating current signal determines a time window in which the received signals are digitally sampled. To avoid aliasing effects, the received analog signals are sampled at a rate well above the maximum harmonic frequency of interest. To improve the signal-to-noise ratio of the received signals, a long integration time is used.

In accordance with the present invention, the corresponding digital signal samples obtained in each fundamental cycle are cumulatively summed over a plurality of fundamental cycles. Thus, by summing corresponding digital signal samples over a sufficiently large number of cycles, a long integration time is effectively achieved. The summed digital signal samples form stacked signals. It is noted that the stacking process described above is repeated for each of the plurality of receiver coils. By processing the stacked signals, rather than all the sampled signals individually, the amount of data that needs to be stored, transmitted and processed is reduced dramatically.

In the preferred embodiment, the stacked data are transmitted to a computer located at the surface for further processing. In particular, Fourier transforms are performed on the stacked signals to determine the magnitudes of in-phase and quadrature components of the stacked signals at the various frequencies of interest. The in-phase and quadrature component magnitudes at each of the frequencies of interest are used to determine the true formation conductivity. Thus, by utilizing the stacking method in the preferred embodiment, the amount of data that needs to be processed is reduced dramatically, thereby avoiding the necessity of transmitting a voluminous amount of data to a computer located on the surface. This is particularly advantageous as the data transmission capacity of the wireline cable connecting the surface computer to the downhole sonde is limited.

In addition, because the signal applied to the transmitter coil is preferably a square wave signal, the various frequencies of interest, which are all harmonics of the fundamental frequency, form frequency components of the transmitter signal. The analysis of the stacked signals at various harmonics of the fundamental frequency can be accomplished by analysis of a single set of stacked signals. The formation conductivity derived from the multiple-frequency response allows for better accuracy than would be achievable based on a single-frequency response. By performing a discrete Fourier transform on the stacked, digitized signals, the analysis at multiple frequencies can be performed without the need for extra analog circuitry corresponding to each frequency of interest.

BRIEF DESCRIPTION OF THE DRAWINGS

A better understanding of the present invention can be obtained when the following detailed description of the preferred embodiment is considered in conjunction with the following drawings, in which.

DETAILED DESCRIPTION OF THE PREFERRED EMBODIMENT

Figure 1:
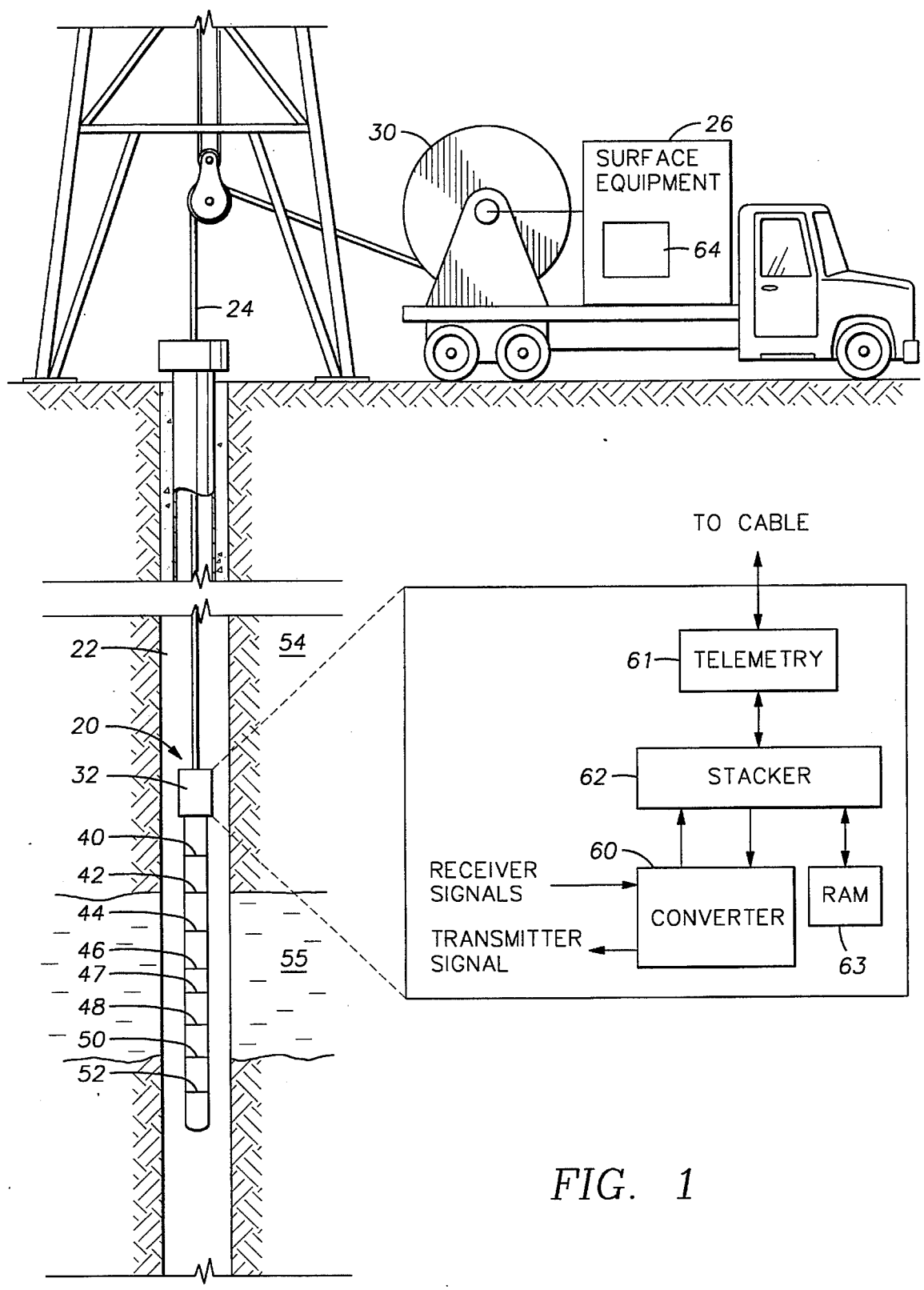
FIG. 1 is an illustration showing an induction logging tool according to the present invention positioned in a borehole for measuring the conductivity of the adjacent formation.

Referring now to FIG. 1, an induction logging tool 20 according to the present invention is shown positioned in a borehole 22 penetrating earth formations 54. The tool 20, which is suspended in the borehole 22 by means of a wireline cable 24, includes a borehole sonde 34 and an electronic circuitry section 32. The tool 20 is lowered into the borehole 22 by a cable 24, which preferably passes over a sheave 30 located at the surface of the borehole 22. The cable 24 is typically spooled onto a drum (not shown). The cable 24 includes insulated electric conductors for transmitting electrical signals. The electronic circuitry section 32 of the tool 20 receives signals from the sonde section 34 to perform various analog and digital functions, as will be described later.

The sonde 34 preferably includes a plurality of coils 40–52. Coil 46 is a transmitter coil for transmitting an oscillating signal into the adjacent surrounding geological formation 54. Preferably, a square wave signal is supplied to the coil 46. However, it is contemplated that any of a number of oscillating voltage signals having multiple frequency components can be used. Further, it is desirable that, on occasion, a single-frequency signal, such as a sinusoidal signal, is used. The oscillating voltage signal applied to the coil 46 generates a current in coil 46 which in turn generates an electromagnetic field in the surrounding formation 54. The electromagnetic field, in turn, induces eddy currents which flow coaxially with respect to the borehole 22. The magnitudes of the eddy currents are proportional to the conductivity of the surrounding formation 54. The remaining coils 40, 42, 44, 47, 48, 50 and 52 are receiver coils in which signals are induced by the electric fields caused by the eddy currents produced in the formation. As the tool 20 is raised in the borehole 22, the conductivity of the surrounding formation 54 can be determined from the received signals in order that a bed or layer 55 having a conductivity indicative of the possibility of containing hydrocarbons may be located.

The electronic circuitry section 32 includes a converter circuit 60, a stacker circuit 62, a random access memory (RAM) 63, and a telemetry circuit 61. The converter circuit 60 comprises a plurality of pre-amplifiers, filters, and analog-to-digital (A/D) converters for receiving signals from the receiver coils 40–52 and transforming them into digitized signals for further processing by the stacker circuit 62. The analog voltage signals provided by the receiver coils 40–52 are digitally sampled according to a predetermined sampling rate in the period defined by the fundamental frequency of the transmitter signal, which in this embodiment is approximately 10 kHz.

The sampling is repeated over a large number of transmitter voltage signal cycles, preferably at least 1,024 cycles to improve the signal-to-noise ratio of the received signals. To reduce the amount of data that must be stored or transmitted, corresponding digital samples taken in each of the transmitter cycles are summed. The summed digital signal samples corresponding to each of the plurality of receiver coils form corresponding stacked signal samples, which are stored in the RAM 63. The stacked signals corresponding to the plurality of receiver coils 40–52 can then be retrieved from the RAM 63 and can be transmitted by the telemetry circuit 61 through the cable 24 to a computer 64 which forms part of the surface equipment 26, where Fourier analyses of the stacked signals can be performed.

In an alternative embodiment, a microprocessor having sufficient digital signal processing capabilities could form part of the electronic circuitry section 32. Thus, it is contemplated that the required discrete Fourier transform could be performed downhole, which would further reduce the amount of data to be transmitted to the surface.

Figure 2:
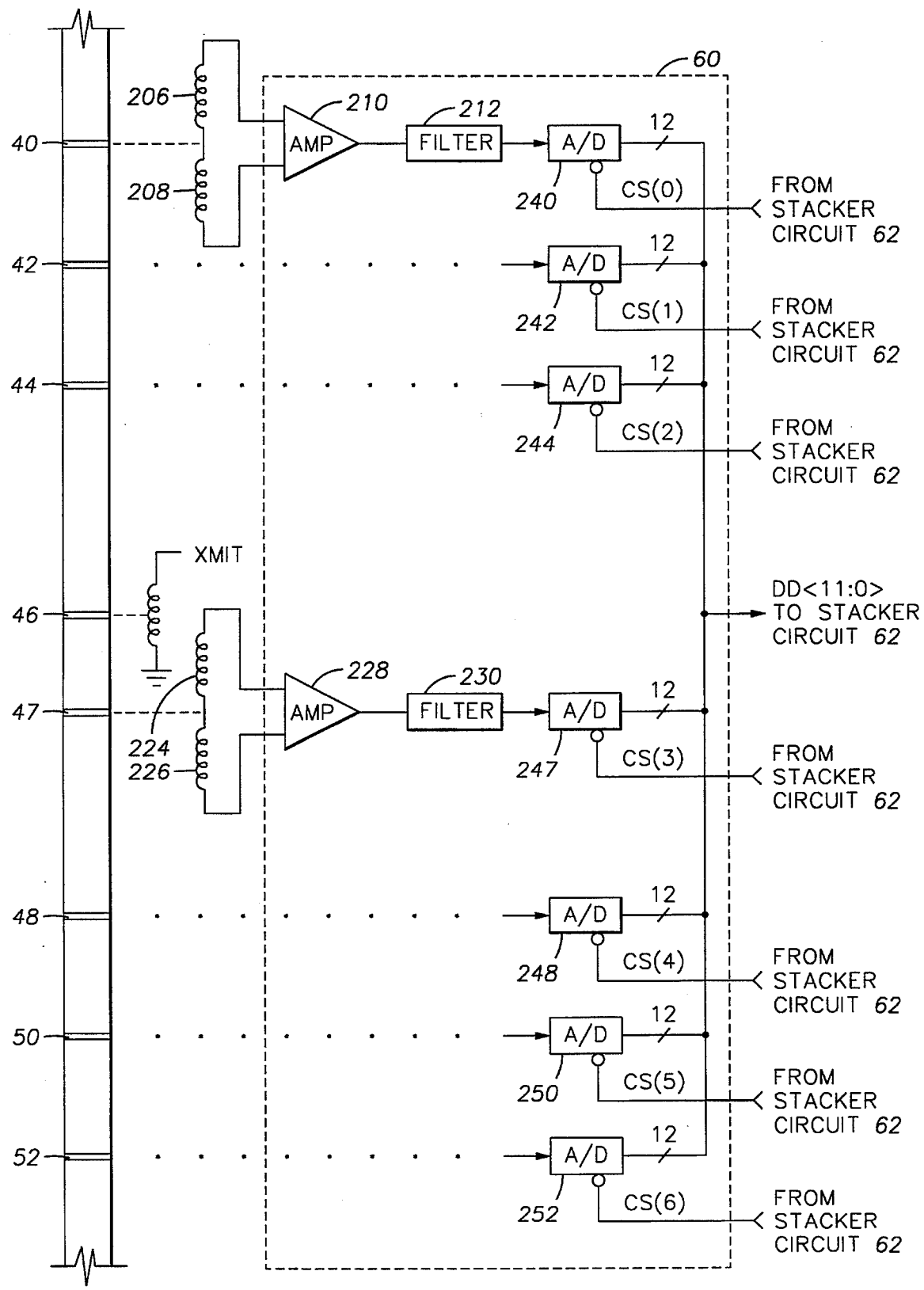
FIG. 2 is an illustration partly in schematic block diagram form, of a portion of the logging tool shown in FIG. 1 showing in greater detail the transmitter and receiver coils and their associated circuitry.

Referring now to FIG. 2, the transmitter coil 46, the receiver coils 40–52, and circuitry located in the converter circuit 60 are shown in greater detail. The transmitter coil 46 is connected between an input connection for receiving the transmitter signal XMIT and ground. The signal XMIT, which is provided by the stacker circuit 62, is preferably a square wave signal having a preferred frequency of approximately 10 kHz. It is known that a square wave signal $V_T(\Omega)$, where $\Omega$ represents the frequency of the multiple components of the square wave signal, is characterized by $$V_T(\omega) \propto \frac{1}{\omega}. \qquad (1)$$

Since the transmitter coil 46 is primarily inductive, the current generated by the coil 46 in response to the square wave voltage signal is inversely proportional to the square of the frequency $\Omega$, that is, $$I_T(\omega) \propto \frac{1}{\omega^2}. \qquad (2)$$

where $V_R(\Omega)$ represents the voltage received by any of the receiver coils 40–52 and $\sigma$ represents the true conductivity. The voltage signals generated by the eddy current induced currents in the receiver coils 40–52 are defined by the following equation:

$$V_R(\Omega) \propto \sigma I_T(\Omega)\Omega^2, \qquad (3)$$

where $V_R(\Omega)$ represents the voltage received by any of the receiver coils 40–52 and $\sigma$ represents the true conductivity of the formation layer 55. Therefore, it can be seen that the amplitude of the received voltage signal $V_R(\Omega)$ does not vary with the frequency $\Omega$. Thus, the amplitudes of $V_R(\Omega)$ at the various frequency components of the square wave signal are approximately the same, which keeps the dynamic range of measured voltage values to a minimum.

Although not shown as such, the receiver coil 47 is preferably intimately coupled with the transmitter coil 46 for monitoring the current passing through the transmitter coil 46. The current signal passing through the receiver coil 47 is used as a reference signal to remove phase shifts and distortions associated with the circuitry located in the transmitter electronics and the converter circuit 60. The receiver coil 47 comprises a primary coil 224 and a secondary or bucking coil 226. The secondary coil 226 is connected in series with the primary coil 224, but is wound in an opposite polarity to the primary coil. The windings of the primary coil 224 and of the secondary coil 226 are chosen so as to substantially balance or null the direct mutual coupling between the transmitter and receiver coils, 46 and 47, respectively. The primary coil 224 is connected as one input of a preamplifier 228 and the secondary coil 226 is connected as the other input of the preamplifier 228. The output of the preamplifier 228 is connected to an anti-aliasing filter 230, whose low-pass, cut-off frequency is preferably at least twice the maximum frequency of interest, and less than one-half the sample frequency.

Another receiver coil 40 similarly comprises a primary coil 206 and a secondary coil 208 which are interconnected and wound in the same manner as coils 224 and 226 described above, which are connected to the inputs of a preamplifier 210. The output of the preamplifier 210 is connected to an anti-aliasing filter 212. All of the other receiver coils 42, 44, 48, 50 and 52 are similarly structured. The output of the anti-aliasing filter 212 corresponding to the receiver coil 40 is connected to the input of an analog-to-digital (A/D) converter 240. In addition, additional A/D converters 242, 244, 247, 248, 250 and 252 are included which are interconnected to corresponding receiver coils 42, 44, 47, 48, 50, and 52, respectively as shown. The A/D converters 240–252 are selected by signals CS[0:6], respectively, which are active logic low pulse signals received from the stacker circuit 62. It will be seen later that the signals CS[0:6] are all synchronized with respect to the transmitter signal XMIT. The low-going pulse of each of the signals CS[0:6] indicates to its respective A/D converter (240 through 252) to begin the next conversion cycle. At the same time, when one of the signals CS[0:6] is at a low state, the 12-bit output of the corresponding A/D converter is enabled.

In the preferred embodiment, each of the signals CS[0:6] are pulsed low once every 1.6 μs, as will be described later. Thus, the sampling rate of the analog signals provided to the A/D converters 240–252 is 625 kHz. Consequently, the A/D converters 240–252 are of such design that the analog-to-digital conversion can be performed in less than 1.6 μs. The outputs of all the A/D converters 240–252 are connected together and represented by a data bus designated as DD[11:0] for application to the stacker current 62. To avoid contention between the A/D converters 240–252, the output of a non-selected A/D converter is tristated. The value of the combined data appearing on the data bus DD[11:0] is a digital representation of the analog signals provided to the A/D converters 240–252. The data bus DD[11:0] is provided to the stacker circuit 62 for further processing of the digital signals.

Figure 3A:
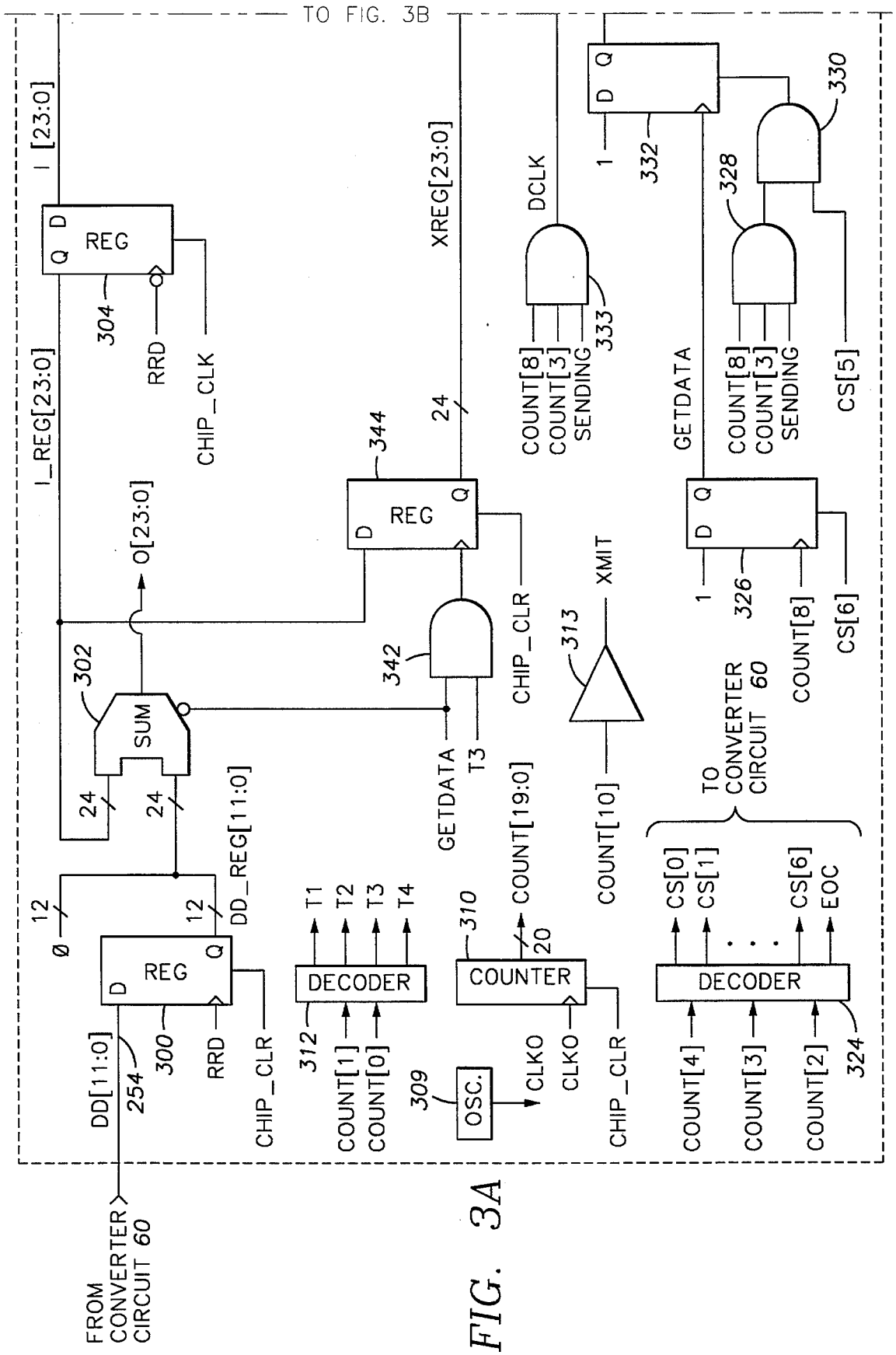
FIG. 3 is a detailed schematic diagram of the stacker circuit shown in FIG. 1.
Figure 3B:
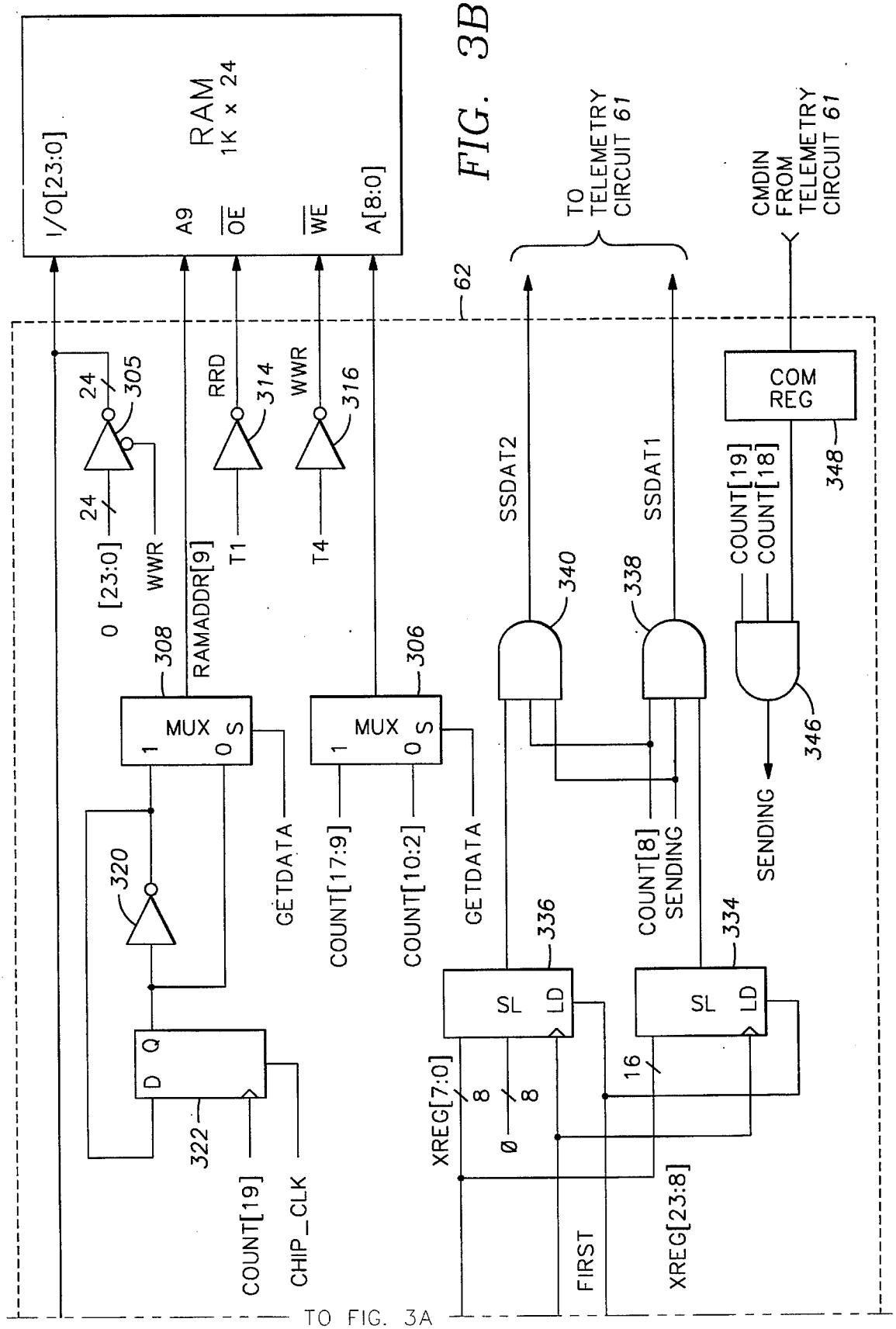

Referring now to FIG. 3, the stacker circuit 62 according to the preferred embodiment of the present invention is shown. In the preferred embodiment, the stacker circuit 62 may be implemented in an Application Specific Integrated Circuit (ASIC). However, the stacker circuit 62 could also be implemented in a digital signal processing (DSP) chip. A register 300 receives the digitized receiver coil signals on the data bus DD[11:0] (line 254) provided by one of the A/D converters 240–252. The data on the bus DD[11:0] is latched into the register 300 on the falling edge of a signal RRD applied to the register 300. The register 300 is cleared by a signal CHIP_CLR, which is asserted upon system power up or system reset. The output DD_REG[11:0] is appended with 12 zeros and provided to the addend input of an adder 302. The augend input of the adder 302 is connected to a bus I_REG[23:0] provided by a register 304. The 24-bit output 0[23:0] of the adder 302, which represents the sum of the data bus I REG[23:0] and the data bus DD_REG[11:0] when a signal GETDAT is low, is provided to the inputs of a buffer 305. However, if the signal GETDAT is asserted high, which indicates that data to be transmitted to the surface computer 64 is being retrieved from the RAM 63, the output 0[23:0] is driven to the value zero. The outputs of the buffer 305 are connected to a data bus I[23:0] connecting the register 304 and the RAM 63. The outputs of the buffer 305 are tristated if its enable input, connected to a signal WWR, is asserted high. If the signal WWR is asserted low, then the outputs of the buffer 305 are driven onto the memory data bus I[23:0].

The register 304 is connected to the RAM 63 by the data bus I[23:0] as above described. As shown in FIG. 1, the RAM 63 is implemented as a separate chip, apart from the ASIC incorporating the stacker circuit 62. However, in other configurations, the RAM 63 may be integrated into the stacker circuit 62. The RAM 63 is preferably configured as 1 k words by 24 bits, and is addressed by a 10-bit address RAMADDR[9:0] provided as separate bits RAMADDR[9] and RAMADDR[8:0] received from multiplexer circuits 306 and 308, respectively. Multiplexer circuits 306 and 308 will be described in greater detail below. The output enable (OE) input of the RAM 63 is connected to the signal RRD output and the write enable (WE) input of the RAM 63 is connected to the signal WWR output of inverters 314 and 316, respectively, as will hereinafter be further described. Thus, if the signal RRD is driven low, then the RAM 63 is placed into the read mode and data is driven onto the data bus I[23:0] by the RAM 63. However, if the signal WWR is driven low, then the RAM 63 is placed into write mode and its internal output buffers are tristated to allow the RAM 63 to receive data from the bus I[23:0]. During a read operation, data driven onto the bus I[23:0] are latched into the register 304 on the falling edge of the signal RRD. The register 304 is cleared upon the assertion of the signal CHIP_CLR.

In the preferred embodiment, a conventional clock oscillator 309 provides clock signals CLK0 at a selected frequency applied as an input to a 20-bit counter 310. The counter 310 preferably starts at the value 0xFFFFF and decrements on the rising edge of each clock signal CLK0. The counter is initialized by the assertion of the signal CHIP_CLR. The outputs of the counter 310 are bits COUNT[19:0]. Counter bits COUNT[1:0] are provided to a timing pulse generator 312, which outputs four positive timing pulse signals T1, T2, T3 and T4. T1 is generated when COUNT[1] and COUNT[O] are both high. T2 is generated when COUNT[1] is high and COUNT[O] is low. T3 is generated when COUNT [1] is low and COUNT [0] is high. Finally, T4 is generated when both COUNT[i] and COUNT[O] are low. Thus, four timing pulse signals are provided, of which T1 is the first pulse and T4 is the last pulse. Consequently, each of the timing pulse signals T1, T2, T3 and T4 has a pulse width of 50 nanoseconds (ns). The signals T1 and T4 are provided to the inverters 314 and 316 to generate the signals RRD and WWR, respectively. Thus, when the timing signal T1 is asserted high, the signal RRD is asserted low, thereby enabling the read output (OE) of the RAM 63. Similarly, when the signal T4 is asserted high, the signal WWR is driven low to enable the write enable 10 input (WE) of the RAM 63. The counter bit COUNT[10] is connected to the input of a buffer amplifier 313, whose output is the transmitter square wave voltage signal XMIT. The signal XMIT is provided to the transmitter coil 46. The frequency of the oscillator 309 is chosen such that the counter bit COUNT[10], driving the amplifier 313 directly, will provide a fundamental frequency for the transmitter square wave signal XMIT of approximately 10 kHz.

The lower nine address bits RAMADDR[8:0] to the RAM 63 are provided by the multiplexer 306. The first and second inputs of the multiplexer 306 are connected to the counter bits COUNT[10:2] and COUNT[17:9], respectively. The output of the multiplexer 306 is selected by a signal GETDAT. If the signal GETDAT is asserted high, then the counter bits COUNT[17:9] are selected by the multiplexer 306. Otherwise the counter bits COUNT[10:2] are selected. The most significant address bit RAMADDR[9] of the RAM 63 is provided by the multiplexer 308. The multiplexer 308 receives the output of a D flip-flop 322 at its first input and the output of an inverter 320 at its second input. The input of the inverter 320 is connected to the output of the D flip-flop 322. The output of the inverter 320 is also connected to the D input of the D flip-flop 322, which is clocked by the most significant bit COUNT[19] of the counter 310. Thus the address signal RAMADDR[9] is toggled on each rising edge of the counter bit COUNT[19]. In effect, the address signal RAMADDR[9] toggles once every $2^{°}$ (1 Meg) CLK0 cycles. Upon assertion of the signal CHIP_CLR, the D flip-flop 322 is cleared. The output of the multiplexer 308 is selected by the signal GETDAT. Thus, if the signal GETDAT is low, the state of the D flip-flop 322 is passed to the address signal RAMADDR[9]. But if the signal GETDAT is high, then the inverted state of the D flip-flop 322 is passed to the address signal RAMADDR[9]. When asserted high, the signal GETDAT indicates that data is to be retrieved from the RAM 63 at the location determined by the counter bits COUNT[17:9] and the address signal RAMADDR[9] and stored in a register 344 for later transmission to the surface computer 64 through the telemetry circuit 61.

The counter bits COUNT[4:2] are provided to an A/D converter select decoder 324. The outputs of the A/D converter select decoder 324 are the signals CS[6:0], synchronized to the XMIT signal, and an end-of-cycle signal EOC. As described in FIG. 2, each of the signals CS[6:0], when asserted low, enables one of the associated A/D converters 240-252 (see FIG. 2). The signal CS[O] is asserted low when the counter bits COUNT[4:2] have the binary value 000; the signal CS[1] is asserted low when the counter bits COUNT [4:2] have the binary value 001; and so forth. The signal EOC is asserted high when the counter bits COUNT[4:2] have the binary value 111. The EOC cycle is created to allow data from the RAM 63 that are to be transmitted to be loaded into the register 344 without interference with the stacking operation being performed by the stacker circuit 62. Thus, each of the A/D converters 240–252 (FIG. 2) is selected once every 32 CLK0 cycles. Since the frequency of the clock signals CLK0 is preferably 20 MHz, which translates to a period of 50 ns, the effective sampling period of the analog signals received by the A/D converters 240–252 is equal to 50 ns multiplied by a factor of 32, or 1.6 microseconds (s). The sampling period of 1.6 µs translates to a sampling rate of 625 kHz.

The sampling rate of 625 kHz is determined by the maximum frequency of interest. In the preferred embodiment, the 8 harmonics of the 10 kHz square wave signal generated by the transmitter coil 46 that are of interest are 10, 30, 50, 70, 90, 110, 130 and 150 kHz. The response of the surrounding formation to these 8 harmonic frequencies are determined to more accurately derive the conductivity of the formation 54 and a bed of interest 55. Since the maximum frequency of interest in the preferred embodiment is 150 kHz, a sampling rate 4 to 5 times that frequency is desirable to avoid aliasing effects. In consideration of the limitations of the electronic circuitry utilized in the downhole tool 20, a sampling rate of 625 kHz is chosen, which is a little more than 4 times the maximum frequency of 150 kHz.

Thus, according to the preferred embodiment of the present invention, 64 digital samples of each of the analog signals received by the A/D converters 240–252 are taken in each cycle corresponding to the fundamental period of the square wave signal generated by the XMIT signal source 313. To obtain a large integration time to overcome the effects of the poor signal-to-noise ratio of the analog signals received by the receiver coils 40–52, the sampling cycles are repeated 1,024 times. However, the amount of data sampled over the entire integration period is too great to be transmitted to the surface computer 64 in a reasonable amount of time. To reduce the amount of data that needs to be stored and transmitted, the 64 samples taken in each of the sampling cycles are cumulatively summed or stacked to corresponding samples taken in subsequent sampling cycles. Since there are 64 samples taken for each of the 7 A/D converters 240–252 in addition to the 64 "samples" taken during the EOC cycle, the RAM 63 must be capable of storing at least 512 words, wherein each word is 24 bits in length. However, since the data stored in the RAM 63 must be transmitted to the computer 64 located on the surface for further processing, it is desirable that the RAM 63 be divided into two halves to allow the data in one-half to be transmitted to the surface computer 64 while the stacking operation being performed by the stacker circuit 62 continues simultaneously in the other half. Consequently, the RAM 63 is organized as 1 k words by 24 bits.

The data transmission to the surface computer 64 is performed by transmitting logic located in the stacker circuit 62 working in conjunction with the telemetry circuit 61. Data from the RAM 63 is serially output, 2 bits at a time, to the surface computer 64. In the preferred embodiment, each word of the RAM 63 is output to the surface computer 64 in a period of approximately 25.6 µs. The counter bit COUNT[8] is used to indicate when 512 CLK0 cycles, which occurs in a period of 25.6 µs, has transpired. The counter bit COUNT[8] is provided to the clock input of a D flip-flop 326. The D input of the D flip-flop 326 is tied high and its inverted clear input is connected to the signal CS[6]. Thus, on a high to low transition of the counter bit COUNT[8], the D flip-flop 326 drives its output signal GETDAT high. When asserted, the signal GETDAT indicates that serial registers 334 and 336 are ready to transmit a new word to the computer 64. At the same time the signal GETDAT is asserted high, the timing pulse T1 causes the inverter 314 to drive the signal RRD low. In addition, the multiplexer 308 toggles the state of the address signal RAMADDR[9]. As a result, the data in the other half of the RAM 63 is retrieved and driven onto the data bus I[23:0]. The multiplexer 306 causes the address signals RAMADDR[8:0] to be driven by the counter bits COUNT[17:9]. This is done so that the RAM address RAMADDR[8:0] corresponding to the transmission data changes once ever 512 CLK0 cycles, instead of once every 4 CLK0 cycles when the signal GETDAT is low.

The data received from the RAM 63 is loaded into the register 304 on the falling edge of the signal RRD. The outputs of the register 304, I_REG[23:0], are provided to the inputs of the register 344. The data are loaded into the register 344 on 15 the rising edge of the output of an AND gate 342. The inputs of the AND gate 342 are connected to the signal GETDAT and the timing pulse T3. Thus, once the signal GETDAT is asserted high, the timing pulse T3 transitioning high causes data on the bus I_REG[23:0] to be latched into the register 344. The register 344 is cleared by the signal CHIP_CLR. The outputs of the register 344, XREG[23:0], are provided to the shift registers 334 and 336.

The bus XREG[23:8] is provided to the 16-bit shift register 334 while the bus XREG[7:0] is provided to the 8 most significant bits of the 16-bit shift register 336. The shift registers 334 and 336 are clocked by a signal DCLK, which is provided by an AND gate 333 having inputs COUNT[8], COUNT[3] and SENDING. The signal SENDING is provided by an AND gate 346, whose inputs are connected to the counter bits COUNT[19:18] and a signal CMD_REG[6], which is provided by a command register 348. If the bit in the command register 348 corresponding to the signal CMD_REG[6] is written with the state 0, the data transmitting capability of the stacker circuit 62 is disabled and no data is provided to the surface computer 64. In the preferred embodiment, the other bits of the command register 348 have been reserved for future use. The command registers 348 receives data from the telemetry circuit 61 to allow control of the operation of the stacker circuit 62. It is contemplated that as more features are required of the stacker circuit 62, the command register 348 can be used to control or enable those features.

The signal GETDAT is also connected to the clock input of a D flip-flop 332. The D input of the D flip-flop 332 is tied high and its clear input is connected to the output of an AND gate 330. The first input of the AND gate 330 is connected to the output of an AND gate 328 and its second input is connected to the inverted state of the signal CS[5]. The inputs of the AND gate 328 are connected to the signal COUNT[8], the inverted state of the signal COUNT[3], and the signal SENDING. Thus, if the signals COUNT[8], COUNT[3], SENDING and CS[5] are high, low, high and low respectively, the D flip-flop 332 is cleared. On the rising edge of signal GETDAT, the D flip-flop 332 drives a signal FIRST high. The signal FIRST is provided to the load inputs of the shift registers 334 and 336 to indicate that the register 344 contains new transmission data from RAM 63. If the signal FIRST is high on the rising edge of the signal DCLK, the data on the bus XREG[23:0] are latched into the shift registers 334 and 336. The most significant bits of the shift registers 334 and 336 are provided to AND gates 338 and 340, respectively. The other inputs of the AND gates 338 and 340 are connected to the signals COUNT[8] and SENDING.

The AND gates 338 and 340 drive output signals SSDAT1 and SSDAT2, respectively. The serial data SSDAT1 and SSDAT2 are provided to driving buffers (not shown) located in the telemetry circuit 61 to be transmitted to the surface computer 64. After the first bit is transmitted, the D flip-flop 332 is cleared when the counter bit COUNT[3] and the signal CS[5] drop low, which causes the signal FIRST to be driven low. Thus, on the next rising edge of the signal DCLK, which is caused by the counter bit COUNT[3] rising high again, data in the shift registers 334 and 336 are shifted by one bit to the left. In this manner, all the data in the shift registers 334 and 336 are serially provided to the surface computer 64 in 16 DCLK cycles. It is noted that since the lower 8 bits of the shift register 336 are "don't care" bits, zeros are latched into those locations.

Data in each half of the RAM 63 are provided to the surface computer 64 in approximately 13 milliseconds (512 words multiplied by 25.6 μs). Consequently, the signal SENDING need only be asserted high for one quarter of the total time during which the stacking operation is being performed, preferably when the signals COUNT[18] and COUNT[19] are both high.

Figure 4:
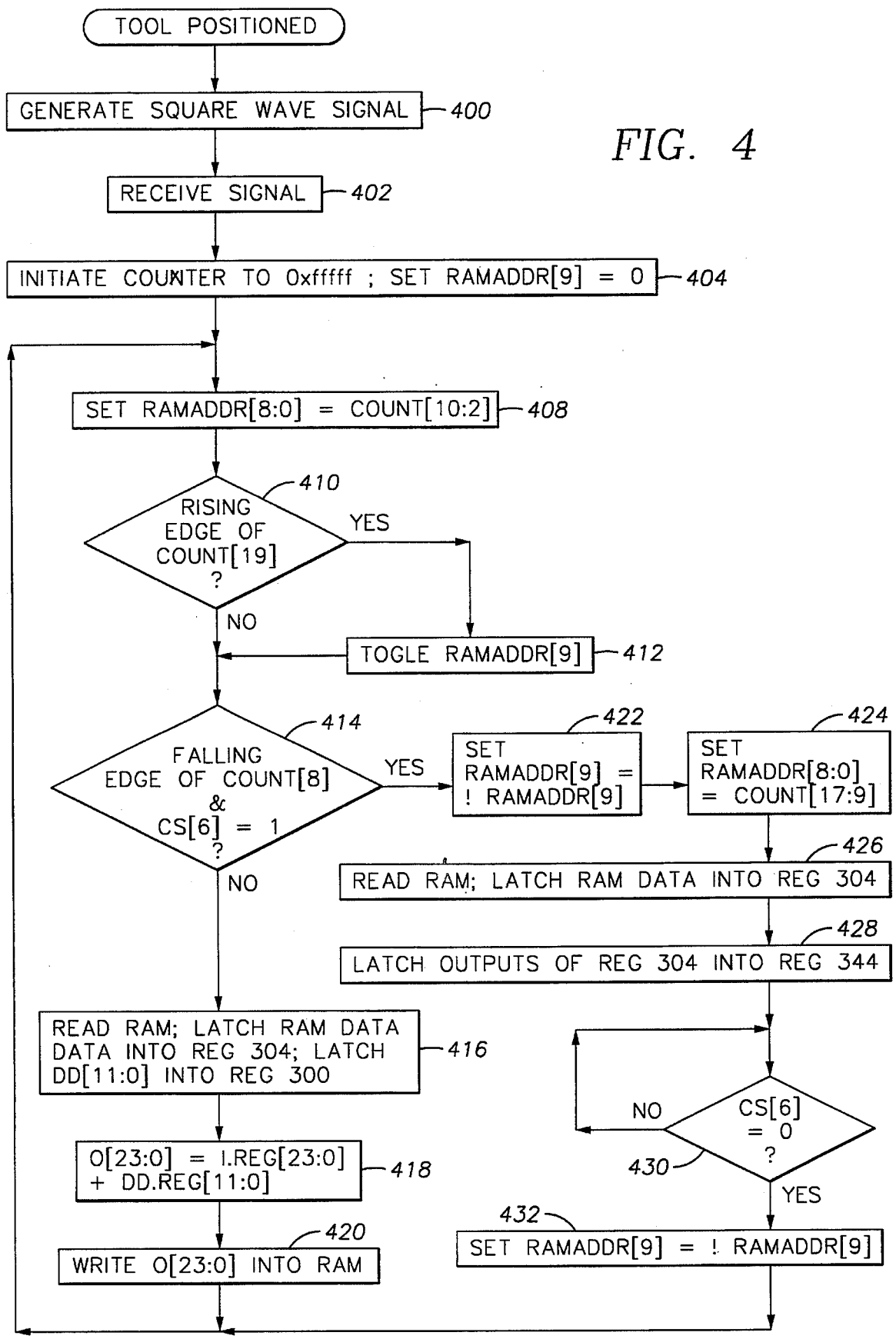
FIG. 4 is a flow diagram provided to more clearly describe the functions of the stacker circuit of FIG. 3.

Referring now to FIG. 4, a flow diagram is shown to more clearly describe the function of the stacker 62. In step 400, the square wave signal XMIT is provided to the transmitter coil 46. As a result, eddy currents are induced in the formation, which cause current to flow through the receiver coils 40–52 as reflected in step 402. As described above, the received signals are provided through an amplifier and an anti-aliasing filter to the A/D converters 240–252. The A/D converters 240–252 convert the analog signals received by the receiver coils 40-52 into digital signals represented by the bus DD[11:0], which are then provided to the stacker circuit 62. The stacker circuit 62 is coupled to the RAM 63, which provides storage locations for the summed data provided by the stacker circuit 62. In step 404, the most significant address bit of the RAM 63 RAMADDR[9] is initialized to the value 0 and the 20-bit counter 310 is initialized to the value 0×FFFFF. The counter 310 is decremented by the clock CLK0, which preferably runs at a frequency of 20 MHz. The counter bits COUNT[4:2] are decoded by the A/D converter select decoder 324 to provide the select signals CS[6:0] and the end-of-cycle signal EOC. The signals CS[6:0] each correspond to one of the seven A/D converters 240–252, as described above in FIG. 2. Next, in step 408, the lower nine address bits RAMADDR[8:0] are set equal to the counter bits COUNT[10:2]. The 512 possible words selected by the counter bits COUNT[10:2] correspond to the seven A/D converters 240–252 multiplied by 64 samples per A/D converter, in addition to 64 words corresponding to those address locations when the signal EOC is high.

In step 410, it is determined if the counter bit COUNT[19] is transitioning from a low to high state. If so, control proceeds to step 412 where the RAM address bit RAMADDR[9] is toggled to the opposite state. The rising edge of the counter bit COUNT[19] signifies that each of the 512 words in the half of the RAM 63 corresponding to the address bit RAMADDR[9] has been summed 1,024 times. Control then proceeds to step 414. If the rising edge of the counter bit COUNT[19] is not detected in step 410, control proceeds to step 414. In step 414, it is determined if the signal CS[6] is high and the counter bit COUNT[8] is falling low. If not, control proceeds to step 416, where data is read from the RAM 63 at the address represented by the address signals RAMADDR[9:0]. The memory read cycle is performed when the timing pulse T1 is asserted high. Concurrently, the retrieved data from the RAM 63 is latched into the register 304. Also concurrently, the digitized signals provided by the corresponding A/D converter are latched into the register 300. Next, in step 418, the contents of the register 300 are added with the contents of the register 304. In step 420, the sum is written into the RAM 63 at address RAMADDR[9:0] on the assertion of timing pulse T4. Control then returns to step 408 where the process is repeated again.

If in step 414 it is determined that the signal CS[6] is high and the count bit COUNT[8] is falling low, then control proceeds to step 422, where the most significant address bit RAMADDR[9] is set to an opposite state by the multiplexer 308. In step 424, the address bits RAMADDR[8:0] is set equal to the count bits COUNT[17:9]. Control then proceeds to step 426, where data is retrieved from the RAM at address RAMADDR[9:0] on the assertion of the timing pulse T1. The retrieved data is latched into the register 304. On the rising edge of the timing pulse T3, the contents of the register 304 are loaded into the register 344. The data in the register 344 are provided to the shift registers 334 and 336 when certain conditions are true (see FIG. 3) and ultimately transmitted serially to the surface computer 64. In step 430 it is determined if the signal CS[6] has been asserted low. Control remains in step 430 until the signal CS[6] is asserted low, in which case, control proceeds to step 432, where the address bit RAMADDR[9] is returned to its original state. Next, control returns to step 408, where the process is repeated again.

It is noted that steps 422–428 do not interfere with the stacking operation performed by the stacker circuit 62. Because the counter 310 decrements from the value 0×FFFFF down to 0, the branch from step 414 to step 422 occurs when the signal EOC, which is decoded by the counter bits COUNT[4:2] having the binary value 111, is asserted high. The EOC cycle has been added primarily to allow the transmission data to be retrieved from the RAM 63 and loaded into the register 344. This allows data to be concurrently transmitted to the surface computer 64 while the stacking operation is being performed.

Thus, from the operation of the stacker circuit 62 according to the preferred embodiment of the present invention, it is seen that each half of the RAM 63 physically stores data according to the following pattern:

| RAM ADDRESS | |
|---|---|
| 0 | sample 0 of A/D converter 240 |
| 1 | sample 0 of A/D converter 242 |
| 2 | sample 0 of A/D converter 244 |
| 3 | sample 0 of A/D converter 247 |
| 4 | sample 0 of A/D converter 248 |
| 5 | sample 0 of A/D converter 250 |
| 6 | sample 0 of A/D converter 252 |
| 7 | EOC data |
| . | |
| . | |
| . | |
| 504 | sample 63 of A/D converter 240 |
| 505 | sample 63 of A/D converter 242 |
| 506 | sample 63 of A/D converter 244 |
| 507 | sample 63 of A/D converter 247 |
| 508 | sample 63 of A/D converter 248 |
| 509 | sample 63 of A/D converter 250 |
| 510 | sample 63 of A/D converter 252 |
| 511 | EOC data |

Each location in the RAM 63, except those locations corresponding to the EOC cycles, is summed with corresponding digitized signals from the A/D converters 240–252 1,024 times. After all of the stacked signals have been transmitted to the surface computer 64, a Fourier transform is performed on the stacked signals corresponding to each of the A/D converters 240252. The Fourier transforms are performed according to the following:

$$X_m(k) = \frac{2}{1{,}024 * N} \sum_{n=0}^{N-1} x_m(n) e^{j2\pi nk/n} \qquad (4)$$

where N=64, m=0, 1, ..., 6, and k is an integer value and the signal $x_m(n)$ represents individually sampled signals cumulatively summed over 1,024 cycles. The signal $x_m(n)$ corresponds to the A/D converter selected by CS(m). From the Fourier transform, the amplitudes of the in-phase and the quadrature components of the stacked digital signals can be obtained at the desired frequencies. The amplitudes of the in-phase and quadrature components can be used to determine the apparent conductivity ($\sigma_a$). A curve is fit through the measured apparent conductivities $\sigma_a$ at the desired frequencies. That curve can be matched to curves of a known conductivity model, from which a single apparent conductivity of the surrounding formation can be estimated. Since the responses have been obtained at multiple frequencies, a more accurate result is obtained than conductivities based on single frequency responses. However, it is quite possible to use just the information from a single frequency, such as the fundamental frequency, if sufficient comparison curve data is not available.

For formations having higher conductivities, the apparent conductivities vary much more with frequency. In addition, the apparent conductivity $\sigma_a$ measured at each frequency $\Omega$ is significantly different from the true conductivity $\sigma$. However, it can be shown that in a homogeneous environment $$\lim_{\Omega \to 0} (\sigma_a) = \sigma \qquad (5)$$

Thus, by extrapolating the fitted curve back to zero frequency, that is, $\Omega=0$, a more accurate value of true conductivity $\sigma$ can be calculated.

The curve can also be extrapolated to higher frequencies. Under certain conditions, this would enable the simulation of the responses of certain measurement-while-drilling (MWD) tools, which typically operate at frequencies around 1–2 Mhz.

Thus, an apparatus and method has been described to digitally process signals received by an induction logging tool. The apparatus according to the present invention includes a transmitter coil and a plurality of receiver coils. An oscillating voltage signal, which is preferably a square wave signal, having a selected fundamental frequency, is provided to the transmitter coil. The fields generated by current passing through the transmitter coil cause eddy currents to flow in the surrounding formation. The magnitudes of the eddy currents are proportional to the conductivity of the formation. The electric fields generated by the eddy currents in turn induce a voltage in the receiver coils. The received voltage signals generated in the receiver coils are converted to digital voltage signals at a sampling rate well above the maximum frequency of interest. The sampling interval, or window, is synchronized with the transmitter signal. The window in which the received signals are sampled is determined by the period of the fundamental frequency of the oscillating transmitter signal. To achieve a large integration time, corresponding samples obtained during each fundamental frequency cycle are cumulatively summed over a large number of such fundamental cycles. The summed samples form a stacked signal having a length of one fundamental cycle. The stacked signals generated for corresponding receiver coils 10 are transmitted to a surface computer for further processing. Since it is the stacked signals which are being transmitted and not the individual sampled signals obtained over the large number of fundamental cycles, the amount of data that must be stored or transmitted is reduced dramatically. A discrete Fourier analysis is performed on the stacked signals to derive the amplitudes of the in-phase and quadrature components of the stacked digital signals at the frequencies of interest. From the amplitudes of the in-phase and quadrature components of the stacked signals, the conductivity of the formation can be accurately derived.

We claim:

1. An apparatus for measuring conductivity of a geological formation adjacent to a borehole comprising:

a sonde adapted for traversing said borehole;

an oscillator generating an output having a fundamental frequency;

a clock operatively coupled to said oscillator, said clock having a frequency which is an integer multiple of said fundamental frequency of said oscillator output, whereby an output of said oscillator comprises one period during occurrence of a predetermined number of cycles of said clock;

a transmitter disposed within said sonde, said transmitter comprising at least one coil and being coupled to said oscillator, whereby the output of said oscillator is applied to said transmitter for inducing eddy currents in said formation;

a receiver disposed within said sonde, said receiver comprising at least one coil for detecting said eddy currents in said formation and inducing an electrical signal in said receiver;

an analog-to-digital converter coupled to said receiver and to said clock, wherein said received electrical signal is converted into a series of digital signal samples, said series comprising an integer number of digital signal samples generated by said analog-to-digital converter over a time interval coincident with the period of said oscillator;

a digital adder connected to said analog-to-digital converter and to said oscillator for stacking a predetermined number of said series of digital signal samples by adding time-correspondent digital signal samples from each of said predetermined number of said series of digital signal samples to form a stacked series having stacked samples equal in number to the number of said digital signal samples in each of said predetermined number of said series; and a spectral analyzer coupled to an output of said digital adder for determining the magnitudes of an in-phase component and a quadrature component of said signal at said fundamental frequency to estimate the conductivity of said formation.

2. The apparatus of claim 1, wherein said output of said oscillator includes multiple frequency components which are harmonic frequencies of said fundamental frequency.

3. The apparatus of claim 1, further comprising:

a plurality of additional receivers wherein said eddy currents in the formation induce signals in each of said plurality of additional receivers; and a plurality of additional analog-to-digital converters correspondingly coupled to said plurality of additional receivers, each of said additional analog-to-digital converters further coupled to said clock and to said digital adder, wherein said electrical signals are converted into a plurality of additional stacked series, each of said plurality of additional stacked series having an integer number of said digital signal samples corresponding to a time interval coincident to a period of said oscillator.

4. The apparatus of claim 3, wherein said digital adder includes:

means connected to said plurality of analog-to-digital converters for generating a plurality of enable signals corresponding to said plurality of analog-to-digital converters, wherein an asserted enable signal causes the corresponding analog-to-digital converter to be connected to said digital adder.

5. The apparatus of claim 1, wherein said receiver comprises a primary coil and a secondary coil, said primary coil and said secondary coil being wound so as to substantially null the direct mutual coupling between said receiver and said transmitter.

6. A method of measuring conductivity of a geological formation adjacent to a borehole, comprising the steps of:

positioning an apparatus including a transmitter and a receiver at a desired position in the borehole;

generating an oscillating current signal having a fundamental frequency and applying said oscillating current signal to said transmitter, wherein said oscillating current signal induces eddy currents in said formation, the magnitudes of said currents being proportional to said conductivity of said formation;

receiving an electrical signal induced in said receiver by said eddy currents in said formation;

generating a clock signal which has a frequency which is an integer multiple of said fundamental frequency of said oscillating current signal, said clock signal synchronized to said oscillating current signal;

converting said received electrical signal into digital signal samples, wherein said digital signal samples are provided on at least an integer multiple number of cycles of said clock signal, each of said samples representing a different portion of a period of said oscillating current signal;

summing corresponding digital signal samples obtained at each portion of said period of said oscillating current signal for a plurality of periods of said oscillating current signal, wherein said summed digital signal samples form a stacked signal for each portion of said period of said oscillating signal; and performing a frequency analysis of said stacked signals to derive an amplitude of an in-phase component and an amplitude of a quadrature component of said stacked signals at said fundamental frequency, wherein said amplitudes are indicative of said conductivity of said formation.

7. The method of claim 6, wherein said oscillating current signal includes multiple frequencies which are harmonic frequencies of said fundamental frequency.

8. The method of claim 7, wherein said step of performing a frequency analysis further includes deriving amplitudes of said in-phase components and amplitudes of said quadrature components of said stacked signals at several of said multiple frequencies, wherein said amplitudes are indicative of the conductivity of the formation.

9. The method of claim 6, wherein said apparatus further includes a plurality of additional receivers, said method further comprising the steps of:

receiving electrical signals induced in each of said plurality of additional receivers by said eddy currents in said formation;

converting said received electrical signals into corresponding digital signal samples for each of said additional receivers, wherein said digital signal samples are provided on at least the integer multiple number of cycles of said clock signal, each of said samples representing a different portion of said period of said oscillating current signal;

summing corresponding digital signal samples obtained at each portion of said period of said oscillating current signal for each of said additional receivers for a plurality of periods of said oscillating current signal, wherein said summed digital signal samples form stacked signals for each portion of said cycle of said oscillating current signal to form a plurality of stacked signals corresponding to said plurality of additional receivers; and performing frequency analyses of said stacked signals to derive amplitudes of in-phase components and amplitudes of quadrature components corresponding to said stacked signals at a frequency of interest, wherein said amplitudes of said in-phase components and said quadrature components are indicative of said conductivity of said formation.

10. A method for processing signals from a well logging tool, said tool used to determine at least one characteristic of a formation penetrated by a wellbore, said tool comprising at least one transmitter and at least one receiver, said method comprising the steps of:

activating said at least one transmitter with electrical energy having a periodic waveform, said electrical energy also having a predetermined fundamental frequency and predetermined supplemental frequencies, for a predetermined whole number of cycles of said energy, said cycles corresponding to said predetermined fundamental frequency;

activating said at least one receiver to generate electrical signals corresponding to a characteristic response of said formation to said energy;

digitizing said electrical signals into a plurality of digital signal samples corresponding to time segments of a single cycle of said energy;

repeating said step of digitizing said signals for a number of times equal to said predetermined number of cycles of said energy during subsequent cycles of said energy;

adding time-correspondent samples from said subsequent cycles of said energy to said time-correspondent samples from previous cycles of said energy, thereby creating stacked signals corresponding to said time segments of said cycle of said energy; and spectrally analyzing said stacked signals to determine said at least one characteristic response of said formation to said energy.

11. A logging tool for measuring the conductivity of a subsurface geological formation adjacent to a borehole in association with surface equipment, comprising:

an oscillating signal generator for providing an oscillating signal having a predetermined frequency and waveform and a clock signal having a frequency which is an integer multiple of the frequency of said oscillating signal, said clock signal synchronized to said oscillating signal, at least one transmitting coil coupled to said oscillating signal generator for receiving said oscillating signals and inducing eddy currents in response thereto in the subsurface geological formation proportional to the conductivity of the geological formation, at least one receiving coil for detecting said electric fields created by said eddy currents produced in said geological formation by said transmitted signals and generating analog electrical signals in said at least one receiving coil in response thereto, an analog-to-digital converter coupled to said at least one receiving coil and said oscillating signal generator for converting said received analog electrical signals proportional to the conductivity of the geological formation into digital signals, a digital sampling circuit coupled to said analog-to-digital converter and said oscillating signal generator for converting said digital signals into a predetermined number of digital signal samples occurring during each cycle of said oscillating signal, each of said samples representing a different portion of said oscillating signal cycle, a digital stacking circuit coupled to said digital sampling circuit and said oscillating signal generator for summing said digital signal samples obtained at each portion of said oscillating signal cycle for a plurality of oscillating signal cycles and forming a stacked digital signal for each portion of said oscillating signal cycle, and a telemetry unit coupled to the surface equipment and said stacking circuit for providing said stacked digital signals for all portions of said oscillating signal cycle to said surface equipment, wherein said surface equipment performs a frequency spectral analysis of said stacked digital signals to determine the conductivity of the geological formation.

12. The logging tool of claim 11, wherein said output of said oscillating signal generator includes multiple frequency components which are harmonic frequencies of said fundamental frequency.

13. The apparatus of claim 11, further comprising:

a plurality of additional receiving coils, wherein said eddy currents in the formation induce signals in each of said plurality of additional receiving coils; and a plurality of additional analog-to-digital converters correspondingly coupled to said plurality of additional receiving coils, each of said additional analog-to-digital converters further coupled to said oscillating signal generator clock signal, said digital sampling circuit and said digital stacking circuit, wherein said electrical signals induced in said additional receiving coils are converted into a plurality of additional stacked series, each of said plurality of additional stacked series having an integer number of said digital signal samples corresponding to a time interval coincident to a period of said oscillating signal generator.

14. The apparatus of claim 13, wherein said digital stacking circuit includes:

means connected to said plurality of analog-to-digital converters for generating a plurality of enable signals corresponding to said plurality of analog-to-digital converters, wherein an asserted enable signal causes the corresponding analog-to-digital converter to be connected to said digital stacking circuit.

15. The apparatus of claim 11, wherein said receiving coil comprises a primary coil and a secondary coil, said primary coil and said secondary coil being wound so as to substantially null the direct mutual coupling between said receiving coil and said transmitting coil.

* * * * *